(12) United States Patent
Eguchi et al.

(10) Patent No.: US 6,545,820 B2
(45) Date of Patent: Apr. 8, 2003

(54) ZOOM LENS SYSTEM

(75) Inventors: Masaru Eguchi, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/960,942

(22) Filed: Sep. 25, 2001

(65) Prior Publication Data

US 2002/0041449 A1 Apr. 11, 2002

(30) Foreign Application Priority Data

Oct. 2, 2000 (JP) .................................. 2000-301732

(51) Int. Cl.⁷ ............................................. G02B 15/14
(52) U.S. Cl. ..................... 359/692; 359/689; 359/680; 359/716; 359/717
(58) Field of Search ................................. 359/692, 689, 359/680, 716, 717, 686, 687, 688, 690, 676, 683

(56) References Cited

U.S. PATENT DOCUMENTS

| | | | | |
|---|---|---|---|---|
| 5,610,767 A | * | 3/1997 | Ito ............................... 359/689 |
| 5,663,838 A | | 9/1997 | Hasushita et al. ........... 359/692 |
| 5,666,233 A | | 9/1997 | Ogata ........................... 359/692 |
| 5,684,638 A | | 11/1997 | Kamo et al. .................. 359/692 |
| 5,687,028 A | | 11/1997 | Ito ............................... 359/692 |
| 5,777,800 A | | 7/1998 | Yamaguchi et al. ........ 359/692 |
| 5,930,052 A | | 7/1999 | Enomoto et al. ............ 359/692 |
| 6,181,484 B1 | * | 1/2001 | Sato ............................. 359/692 |
| 6,185,050 B1 | * | 2/2001 | Ota et al. .................... 359/687 |
| 6,236,518 B1 | | 5/2001 | Enomoto ..................... 359/692 |
| 6,268,965 B1 | | 7/2001 | Enomoto ..................... 359/692 |
| 6,268,966 B1 | | 7/2001 | Ishii et al. ................... 359/692 |
| 6,353,507 B1 | * | 3/2002 | Enomoto ..................... 359/680 |
| 2001/0036021 A1 | * | 11/2001 | Enomoto ..................... 359/692 |

FOREIGN PATENT DOCUMENTS

| JP | 7-181382 | 7/1995 |
|---|---|---|
| JP | 7-261078 | 10/1995 |
| JP | 9-90220 | 4/1997 |
| JP | 2000-193885 | 7/2000 |

* cited by examiner

*Primary Examiner*—Evelyn A. Lester
(74) *Attorney, Agent, or Firm*—Greenblum & Bernstein, P.L.C.

(57) ABSTRACT

A zoom lens system includes a positive first lens group, and a negative second lens. Zooming is performed by varying the distance between the first lens group and the second lens group. The first lens group includes a negative first sub lens group and a positive second sub lens group. The zoom lens system satisfies the following conditions:

$$5.0 < ft/f1 < 7.0 \qquad (1)$$

$$0.9 < |fw/f1a| < 1.8 \qquad (2)$$

wherein ft designates the focal length of the entire zoom lens system at the long focal length extremity;

f1 designates the focal length of the first lens group;

fw designates the focal length of the entire zoom lens system at the short focal length extremity; and f1$a$ designates the focal length of the first sub lens group of the first lens group.

3 Claims, 9 Drawing Sheets

$F_{NO}=3.7$

—— d Line
······· g Line
— — — C Line

-2    2
SPHERICAL
ABERRATION

CHROMATIC
ABERRATION $W=35.8°$

-0.05   0.05
LATERAL
CHROMATIC
ABERRATION $W=35.8°$

—— S
— — M

-1    1
ASTIGMATISM $W=35.8°$

-3  (%)  3
DISTORTION

Fig.3A
$F_{NO}=9.8$

— d Line
---- g Line
--- C Line

-2  2
SPHERICAL
ABERRATION

CHROMATIC
ABERRATION

Fig.3B
W=15.7°

-0.05  0.05
LATERAL
CHROMATIC
ABERRATION

-1  1
ASTIGMATISM

Fig.3D
W=15.7°

-3 (%)  3
DISTORTION

Fig.4A
$F_{NO}=14.0$

— d Line
---- g Line
--- C Line

-2  2
SPHERICAL
ABERRATION

CHROMATIC
ABERRATION

Fig.4B
W=11.1°

-0.05  0.05
LATERAL
CHROMATIC
ABERRATION

-1  1
ASTIGMATISM

Fig.4D
W=11.1°

-3 (%)  3
DISTORTION

Fig. 5
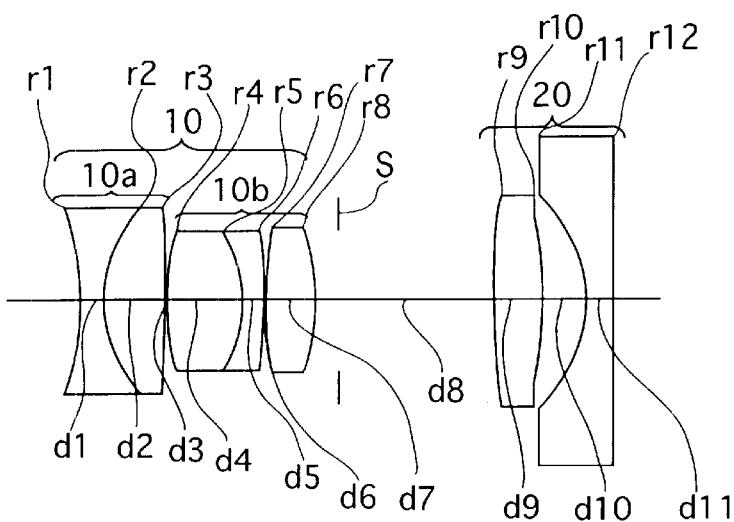
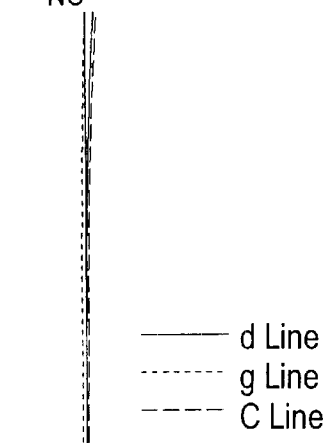
Fig. 6A
$F_{NO}=4.0$
—— d Line
------ g Line
--- C Line
-2    2
SPHERICAL
ABERRATION
CHROMATIC
ABERRATION
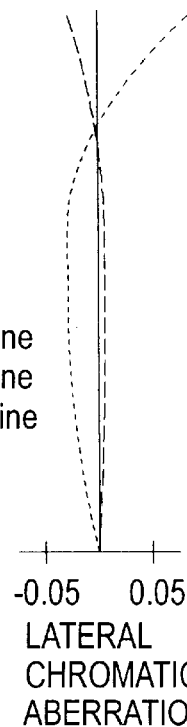
Fig. 6B
$W=39.9°$
-0.05   0.05
LATERAL
CHROMATIC
ABERRATION
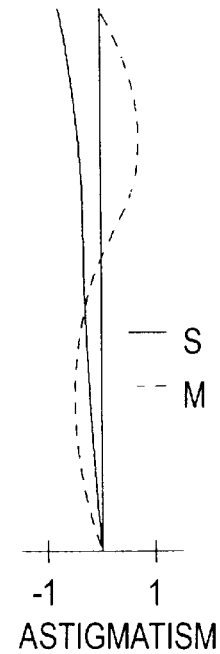
Fig. 6C
$W=39.9°$
—— S
--- M
-1    1
ASTIGMATISM
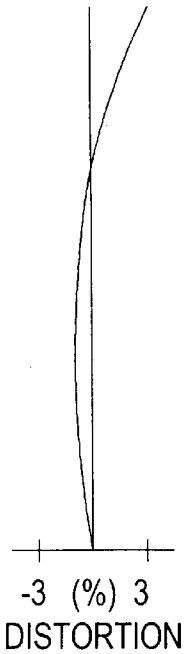
Fig. 6D
$W=39.9°$
-3 (%) 3
DISTORTION

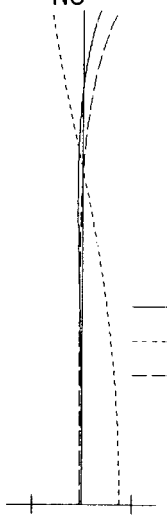
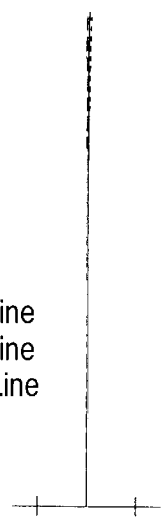
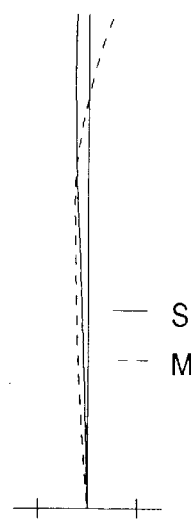
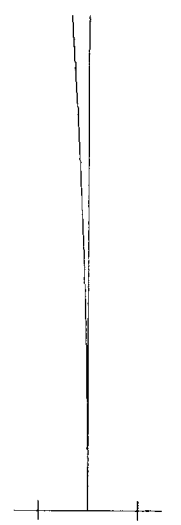
Fig.7A  $F_{NO}=12.7$
SPHERICAL ABERRATION
CHROMATIC ABERRATION
Fig.7B  $W=15.3°$
LATERAL CHROMATIC ABERRATION
Fig.7C  $W=15.3°$
ASTIGMATISM
Fig.7D  $W=15.3°$
DISTORTION
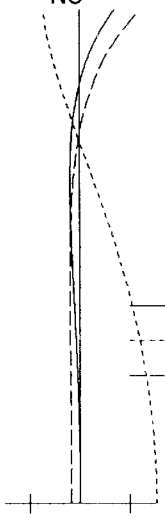
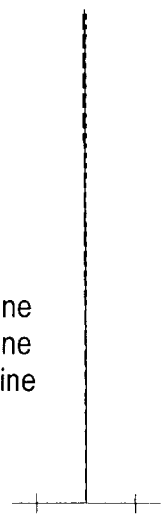
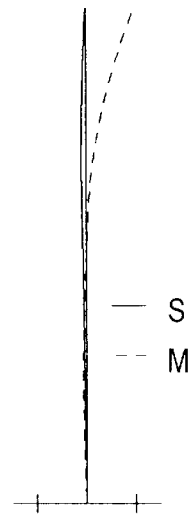
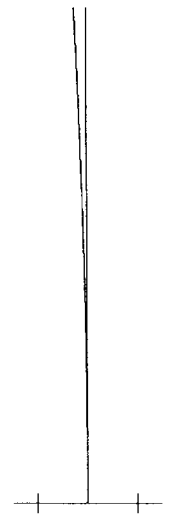
Fig.8A  $F_{NO}=15.8$
SPHERICAL ABERRATION
CHROMATIC ABERRATION
Fig.8B  $W=12.3°$
LATERAL CHROMATIC ABERRATION
Fig.8C  $W=12.3°$
ASTIGMATISM
Fig.8D  $W=12.3°$
DISTORTION Fig. 9
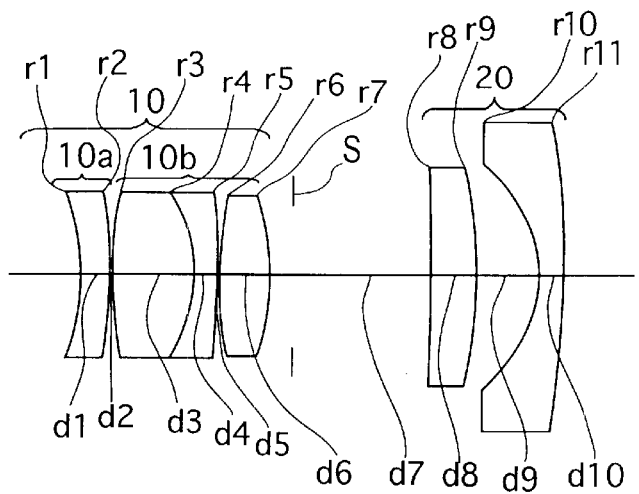
Fig. 10A
$F_{NO}$=4.2
Fig. 10B
W=36.5°
Fig. 10C
W=36.5°
Fig. 10D
W=36.5°
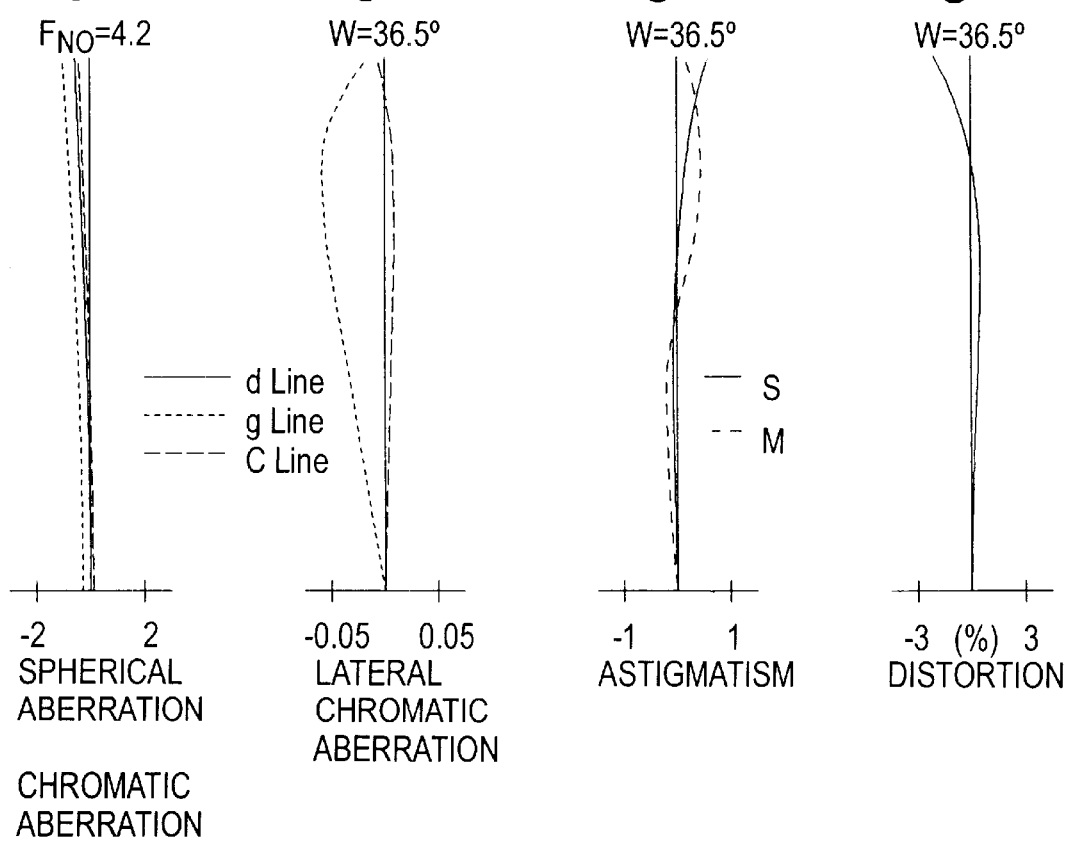
—— d Line
------ g Line
— — C Line
— S
-- M
-2  2
SPHERICAL
ABERRATION
CHROMATIC
ABERRATION
-0.05  0.05
LATERAL
CHROMATIC
ABERRATION
-1  1
ASTIGMATISM
-3 (%) 3
DISTORTION

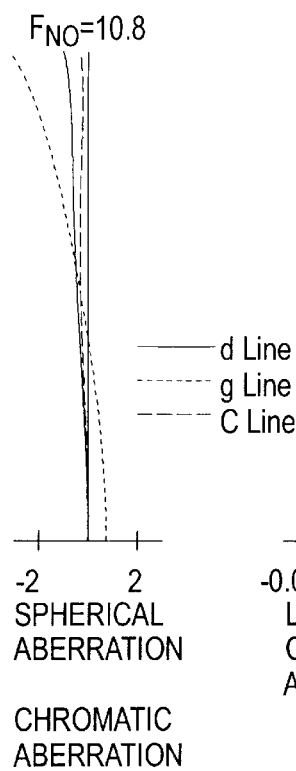
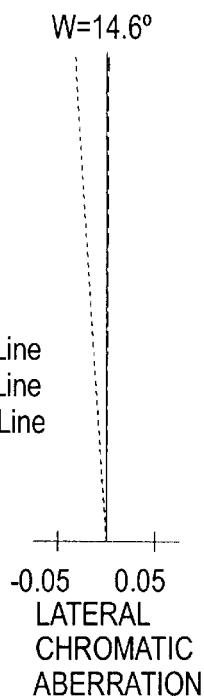
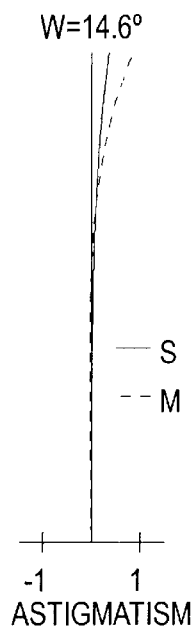
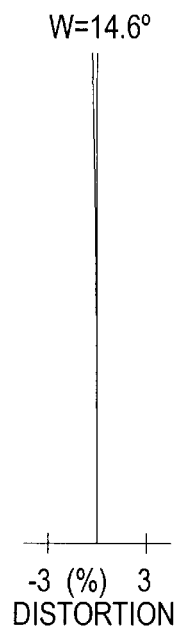
Fig.11A  Fig.11B  Fig.11C  Fig.11D
$F_{NO}=10.8$  W=14.6°  W=14.6°  W=14.6°
— d Line
---- g Line
--- C Line
— S
--- M
-2   2      -0.05  0.05      -1   1      -3 (%) 3
SPHERICAL   LATERAL         ASTIGMATISM  DISTORTION
ABERRATION  CHROMATIC
            ABERRATION
CHROMATIC
ABERRATION
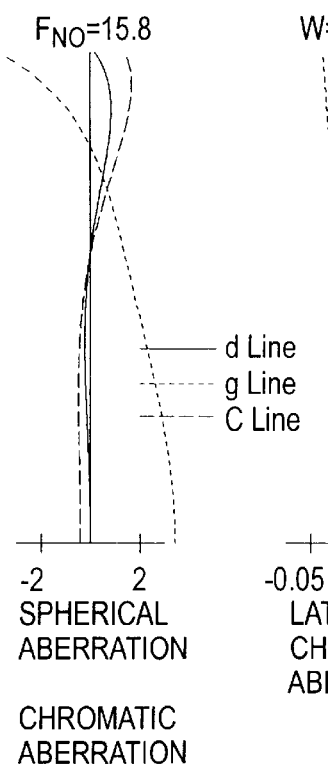
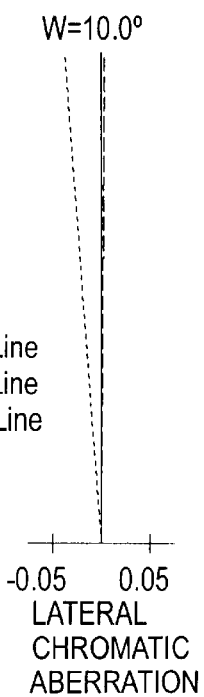
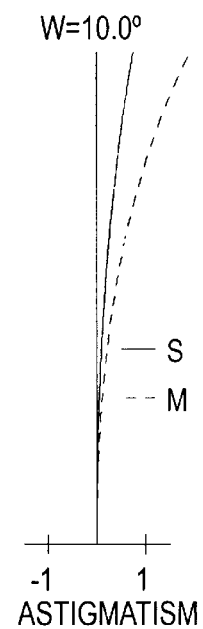
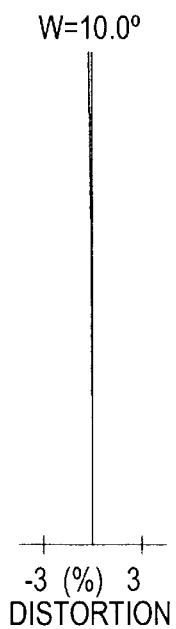
Fig.12A  Fig.12B  Fig.12C  Fig.12D
$F_{NO}=15.8$  W=10.0°  W=10.0°  W=10.0°
— d Line
---- g Line
--- C Line
— S
--- M
-2   2      -0.05  0.05      -1   1      -3 (%) 3
SPHERICAL   LATERAL         ASTIGMATISM  DISTORTION
ABERRATION  CHROMATIC
            ABERRATION
CHROMATIC
ABERRATION Fig. 13
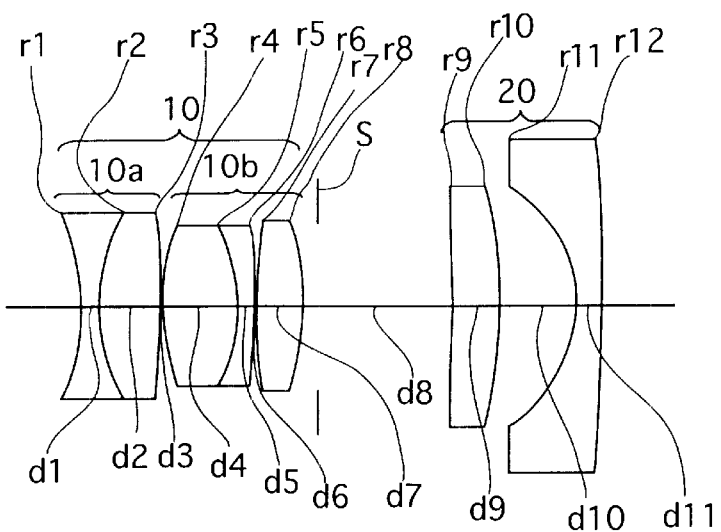
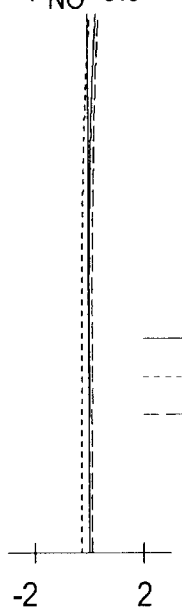
Fig.14A
$F_{NO}=3.9$
— d Line
---- g Line
--- C Line
-2   2
SPHERICAL
ABERRATION
CHROMATIC
ABERRATION
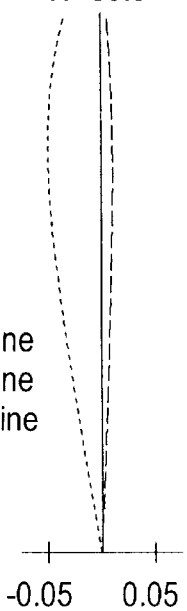
Fig.14B
W=36.0°
-0.05  0.05
LATERAL
CHROMATIC
ABERRATION
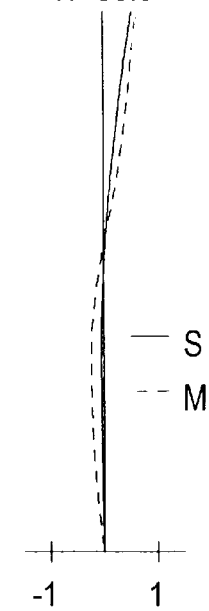
Fig.14C
W=36.0°
— S
-- M
-1   1
ASTIGMATISM
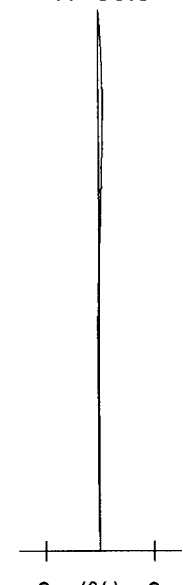
Fig.14D
W=36.0°
-3 (%) 3
DISTORTION $F_{NO}=9.1$

-2    2
SPHERICAL
ABERRATION

CHROMATIC
ABERRATION $W=17.5°$

— d Line
---- g Line
--- C Line

-0.05  0.05
LATERAL
CHROMATIC
ABERRATION $W=17.5°$

— S
-- M

-1    1
ASTIGMATISM $W=17.5°$

-3 (%)  3
DISTORTION $F_{NO}=15.8$

-2    2
SPHERICAL
ABERRATION

CHROMATIC
ABERRATION $W=10.2°$

— d Line
---- g Line
--- C Line

-0.05  0.05
LATERAL
CHROMATIC
ABERRATION $W=10.2°$

— S
-- M

-1    1
ASTIGMATISM $W=10.2°$

-3 (%)  3
DISTORTION

ZOOM LENS SYSTEM

BACKGROUND OF THE INVENTION

1. Field of the Invention

The present invention relates to a zoom lens system for a compact camera (lens-shutter camera).

2. Description of the Prior Art

In a zoom lens system of a compact camera, a long back focal distance is not necessary, unlike a zoom lens system for a single lens reflex camera (SLR camera) which requires a space behind the photographing lens system for providing a quick-return mirror. Accordingly, in a compact camera, a telephoto lens system, including either a positive lens group and a negative lens group, or a positive lens group, a positive lens group and a negative lens group, in this order from the object, is generally employed. On the other hand, in an SLR camera, a retrofocus lens system, including a negative lens group and a positive lens group, in this order from the object, is generally employed.

Recently, in zoom lens systems for compact cameras, there have been increasing requirements for miniaturization, a higher zoom ratio, and a shorter focal length at the short focal length extremity. In order to satisfy the requirement for miniaturization, it is preferable to utilize a two-lens-group zoom lens system including a small number of lens elements. However, in the two-lens-group zoom lens systems of the prior art, if an attempt is made to obtain the zoom ratio of 3.5 or more, it is difficult to attain an adequate balance of aberrations from the short focal length extremity to the long focal length extremity. Furthermore, if an attempt is made to obtain a shorter focal length at the short focal length extremity, the diameter of the front lens group generally becomes larger, which makes miniaturization of the zoom lens system difficult, and makes the correcting of aberrations difficult. Due to these reasons, it has been difficult, in the prior art, to provide a two-lens-group zoom lens system which can attain miniaturization, a higher zoom ratio, and a shorter focal length at the short focal length extremity at the same time.

SUMMARY OF THE INVENTION

An object of the present invention is to provide a small telephoto two-lens-group zoom lens system having a zoom ratio of 3.5 or more, and the half angle-of-view of 35 degrees or more at the short focal length extremity.

In order to achieve the above-mentioned object, there is provided a zoom lens system including a positive first lens group, and a negative second lens, in this order from the object. Zooming is performed by varying the distance between the first lens group and the second lens group. The first lens group includes a negative first sub lens group (1a lens group) and a positive second sub lens group (1b lens group), in this order from the object. The zoom lens system satisfies the following conditions:

$$5.0 < ft/f1 < 7.0 \qquad (1)$$

$$0.9 < |fw/f1a| < 1.8 \qquad (2)$$

wherein ft designates the focal length of the entire zoom lens system at the long focal length extremity;

f1 designates the focal length of the first lens group;

fw designates the focal length of the entire zoom lens system at the short focal length extremity; and f1a designates the focal length of the first sub lens group (1a lens group) of the first lens group.

The most object-side lens element of the first lens group can be a negative lens element having a concave surface facing the object, and preferably satisfies the following condition:

$$0.1 < |r1/ft51 < 0.2 \qquad (3)$$

wherein r1 designates the radius of curvature of the object-side concave surface of the most object-side negative lens element of the first lens group.

It is preferable that at least one surface of lens elements in the first lens group is made aspherical. Similarly, it is preferable that at least one surface of lens elements in the second lens group is made aspherical.

The present disclosure relates to subject matter contained in Japanese Patent Application No. 2000-301732 (filed on Oct. 2, 2000) which is expressly incorporated herein in its entirety.

BRIEF DESCRIPTION OF THE DRAWINGS

The invention will be discussed below in detail with reference to the accompanying drawings, in which:

FIGS. 3A, 3B, 3C and 3D show aberrations occur in the lens arrangement shown in FIG. 1 at an intermediate focal length;

FIGS. 4A, 4B, 4C and 4D show aberrations occur in the lens arrangement shown in FIG. 1 at the long focal length extremity;

FIG. 5 is a lens arrangement of a second embodiment of a zoom lens system according to the present invention;

FIGS. 6A, 6B, 6C and 6D show aberrations occur in the lens arrangement shown in FIG. 5 at the short focal length extremity;

FIGS. 7A, 7B, 7C and 7D show aberrations occur in the lens arrangement shown in FIG. 5 at an intermediate focal length;

FIGS. 8A, 8B, 8C and 8D show aberrations occur in the lens arrangement shown in FIG. 5 at the long focal length extremity;

FIG. 9 is a lens arrangement of a third embodiment of a zoom lens system according to the present invention;

FIGS. 10A, 10B, 10C and 10D show aberrations occur in the lens arrangement shown in FIG. 9 at the short focal length extremity;

FIGS. 11A, 11B, 11C and 11D show aberrations occur in the lens arrangement shown in FIG. 9 at an intermediate focal length;

FIGS. 12A, 12B, 12C and 12D show aberrations occur in the lens arrangement shown in FIG. 9 at the long focal length extremity;

FIG. 13 is a lens arrangement of a fourth embodiment of a zoom lens system according to the present invention;

FIGS. 14A, 14B, 14C and 14D show aberrations occur in the lens arrangement shown in FIG. 13 at the short focal length extremity;

DESCRIPTION OF THE PREFERRED EMBODIMENTS

Figure 17:
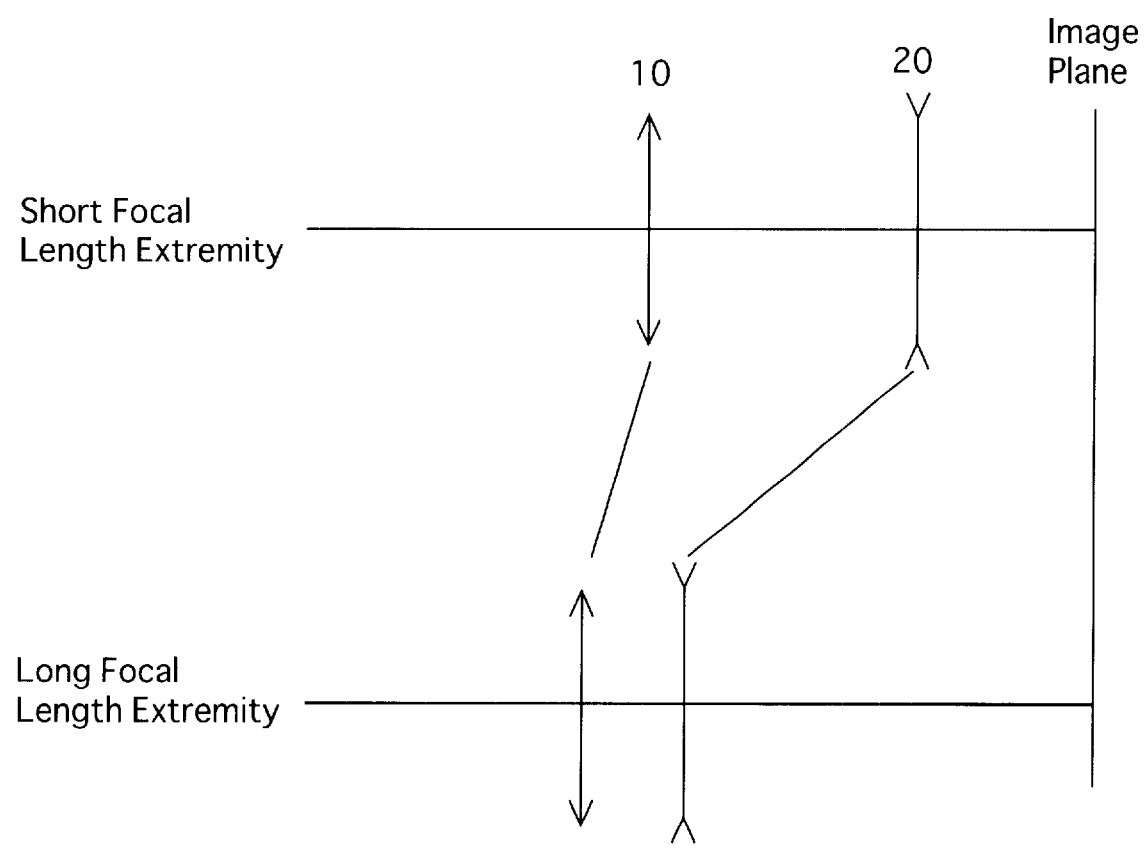
FIG. 17 shows the lens-group moving paths of the zoom lens system according to the present invention.

The zoom lens system of the present invention, as shown in the lens-group moving paths in FIG. 17, is a telephoto zoom lens system including a positive first lens group 10 and a negative second lens group 20, in this order from the object. The positive first lens group 10 includes a first sub lens group 10a (1a lens group) and a second sub lens group 10b (1b lens group). Upon zooming from the short focal length extremity to the long focal length extremity, the first lens group 10 and the second lens group 20 move toward the object while the distance therebetween is varied (reduced).

Condition (1) specifies the refractive power of the first lens group 10 in order to achieve a higher zoom ratio.

If ft/f1 exceeds the lower limit of condition (1) to the extent that the refractive power of the first lens group 10 becomes too weak, the zoom ratio cannot be made higher.

If ft/f1 exceeds the upper limit of condition (1) to the extent that the refractive power of the first lens group 10 becomes too strong, it becomes difficult to reduce spherical aberration.

Condition (2) specifies the negative refractive power of the first sub lens group 10a (1a lens group) of the first lens group 10 in order to maintain a balance between miniaturization of the zoom lens system and the correcting of aberrations.

If |fw/f1a| exceeds the lower limit of condition (2) to the extent that the refractive power (absolute value) of the first sub lens group 10a (1a lens group) becomes too weak, it is difficult to secure a back focal distance at the short focal length extremity.

If |fw/f1a| exceeds the upper limit of condition (2) to the extent that the refractive power (absolute value) of the first sub lens group 10a (1a lens group) becomes too strong, the back focal distance becomes longer, and the refractive power of each lens group becomes stronger. As a result, spherical aberration which occurs in the second sub lens group 10b (1b lens group) becomes larger, and spherical aberration is undercorrected over the entire zoom lens system.

Condition (3) specifies the radius of curvature of a concave surface facing the object, in the case where a negative lens element having the concave surface facing the object is provided as the most object-side lens element of the first lens group. This condition is to attain miniaturization (i.e., a smaller diameter) of the first lens group 10.

If |r1/ft| exceeds the lower limit of condition (3) to the extent that the radius of curvature becomes too small, the correcting of distortion and astigmatism which occur on the concave surface become difficult.

If |r1/ft| exceeds the upper limit of condition (3) to the extent that the radius of curvature becomes too large, the diameter of the first lens group 10 (the front lens group) becomes larger, in the case where the focal length at the short focal length extremity is made shorter.

It is preferable that at least one surface of lens elements in the first lens group 10 is made aspherical. Similarly, it is preferable that at least one surface of lens elements in the second lens group 20 is made aspherical. An aspherical surface provided in the first lens group 10 is effective in mainly correcting spherical aberration over the entire zooming range, and an aspherical surface provided in the second lens group 20 is effective in correcting distortion on the side of shorter focal lengths.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, W designates the half angle-of-view (°), $f_B$ designates the back focal distance, r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

Figure 1:
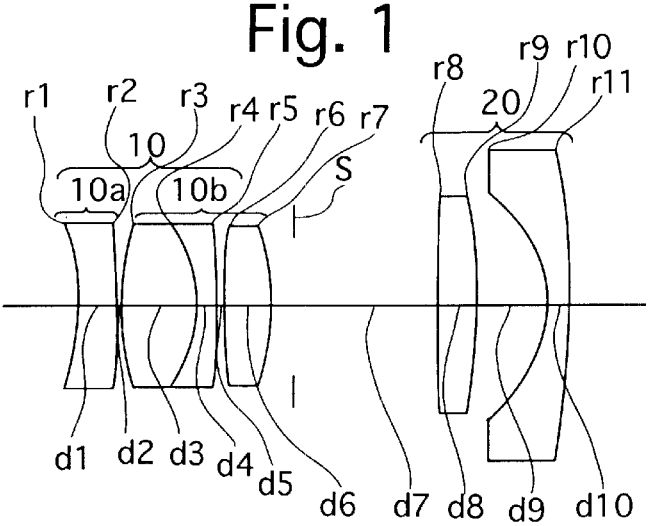
FIG. 1 is a lens arrangement of a first embodiment of a zoom lens system according to the present invention.
Figure 2A:
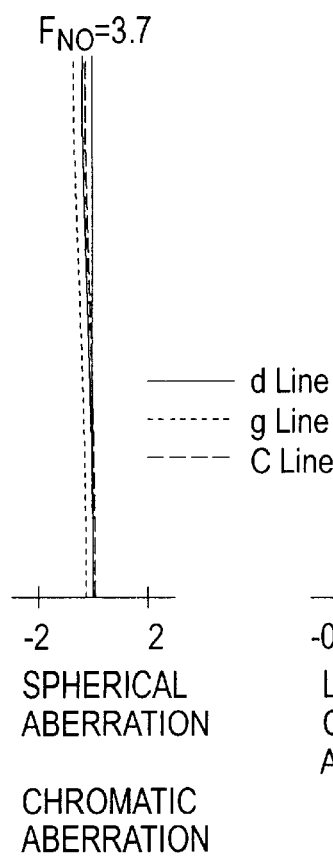
FIGS. 2A, 2B, 2C and 2D show aberrations occur in the lens arrangement shown in FIG. 1 at the short focal length extremity.
Figure 2B:
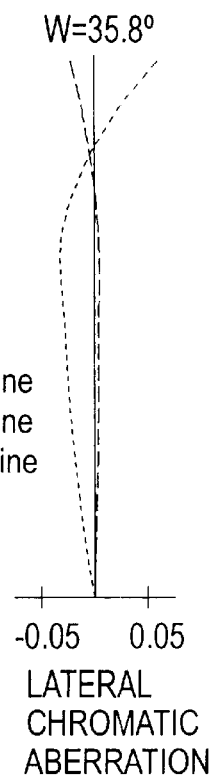
Figure 2C:
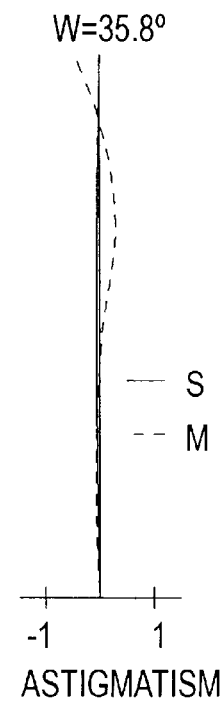
Figure 2D:
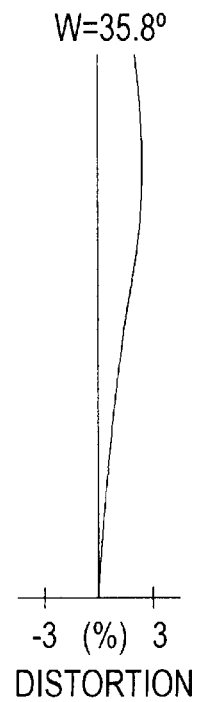
Figure 15A:
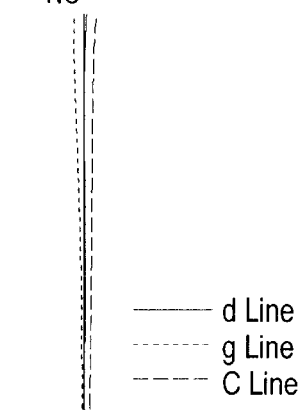
FIGS. 15A, 15B, 15C and 15D show aberrations occur in the lens arrangement shown in FIG. 13 at an intermediate focal length.
Figure 15B:
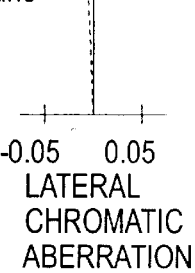
Figure 15C:
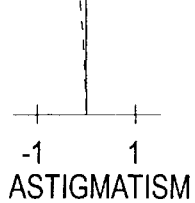
Figure 15D:
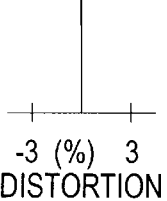
Figure 16A:
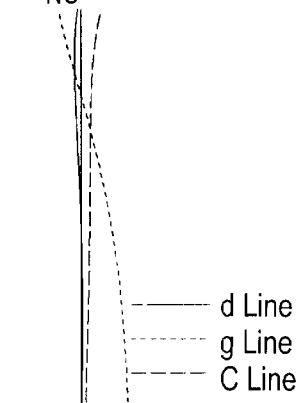
FIGS. 16A, 16B, 16C and 16D show aberrations occur in the lens construction shown in FIG. 13 at the long focal length extremity.
Figure 16B:
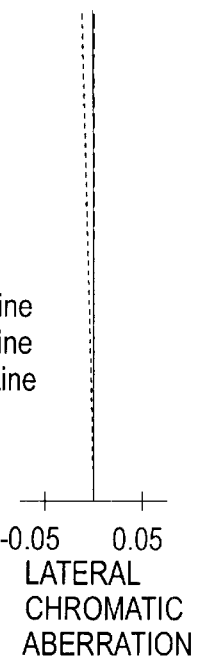
Figure 16C:
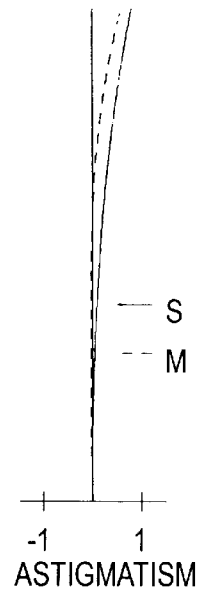
Figure 16D:
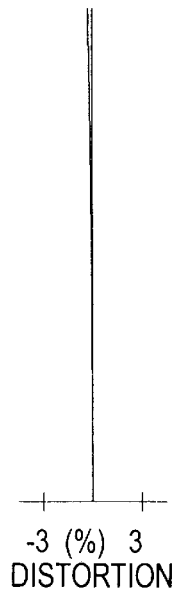

FIGS. 1 through 4D show the first embodiment of the present invention. FIG. 1 is the lens arrangement of the first embodiment of the zoom lens system according to the present invention. The first lens group 10 is composed of the first sub lens group 10a (1a lens group) including a negative single lens element with a concave surface facing the object, and the second sub lens group 10b (1b lens group) including cemented lens elements of a positive lens element and a negative lens element, and a positive lens element, in this order from the object. The second lens group 20 includes a positive lens element and a negative lens element, in this order from the object. Table 1 shows the numerical data of the first embodiment. FIGS. 2A through 2D show aberrations occur in the lens arrangement shown in FIG. 1 at the short focal length extremity. FIGS. 3A through 3D show aberrations occur in the lens arrangement shown in FIG. 1 at an intermediate focal length. FIGS. 4A through 4D show aberrations occur in the lens arrangement shown in FIG. 1 at the long focal length extremity. A diaphragm S is located 1.50 millimeters behind (on the image side) the first lens group 10 (surface No.7).

TABLE 1

$F_{NO}$ = 3.7 − 9.8 − 14.0
f = 29.44 − 77.00 − 110.00 (Zoom Ratio:3.74)
W = 35.8 − 15.7 − 11.1
$f_B$ = 7.94 − 49.67 − 78.62

TABLE 1-continued

| Surf. No. | r | d | Nd | ν |
|---|---|---|---|---|
| 1 | −16.294 | 2.53 | 1.83481 | 42.7 |
| 2 | −56.654 | 0.25 | — | — |
| 3 | 18.014 | 4.91 | 1.48749 | 70.2 |
| 4 | −9.275 | 1.38 | 1.83400 | 37.2 |
| 5 | −50.347 | 0.44 | — | — |
| 6 | 41.926 | 3.10 | 1.73077 | 40.5 |
| 7* | −14.577 | 11.07 − 3.65 − 2.28 | — | — |
| 8* | −85.796 | 2.46 | 1.58547 | 29.9 |
| 9 | −30.955 | 4.42 | — | — |
| 10 | −9.400 | 1.50 | 1.83481 | 42.7 |
| 11 | −53.508 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 7 | 0.00 | $0.8633 \times 10^{-4}$ | $-0.4202 \times 10^{-7}$ | $0.1646 \times 10^{-8}$ |
| 8 | 0.00 | $0.8318 \times 10^{-4}$ | $0.1995 \times 10^{-6}$ | $0.7078 \times 10^{-8}$ |

[Embodiment 2]

FIGS. 5 through 8D show the second embodiment of the present invention. FIG. 5 is the lens arrangement of the second embodiment of the zoom lens system according to the present invention. Table 2 shows the numerical data of the second embodiment. FIGS. 6A through 6D show aberrations occur in the lens arrangement shown in FIG. 5 at the short focal length extremity. FIGS. 7A through 7D show aberrations occur in the lens arrangement shown in FIG. 5 at an intermediate focal length. FIGS. 8A through 8D show aberrations occur in the lens arrangement shown in FIG. 5 at the long focal length extremity. The basic lens arrangement of the second embodiment is the same as the first embodiment except that the first sub lens group 10a (1a lens group) includes cemented lens elements of a negative lens element and a positive lens element. The diaphragm S is located 1.50 millimeters behind (on the image side) the first lens group 10 (surface No.8).

TABLE 2

$F_{NO} = 4.0 - 12.7 - 15.8$
f = 25.07 − 80.20 − 100.30 (Zoom Ratio:4.00)
W = 39.9 − 15.3 − 12.3
$f_B = 8.85 - 66.37 - 87.35$

| Surf. No. | r | d | Nd | ν |
|---|---|---|---|---|
| 1 | −17.717 | 1.50 | 1.88300 | 40.8 |
| 2 | 8.718 | 4.01 | 1.66680 | 33.0 |
| 3 | −74.897 | 0.13 | — | — |
| 4 | 16.369 | 4.86 | 1.50137 | 56.4 |
| 5 | −8.874 | 1.50 | 1.85026 | 32.3 |
| 6 | −31.967 | 0.13 | — | — |
| 7 | 32.984 | 3.26 | 1.69350 | 53.2 |
| 8* | −13.396 | 11.75 − 3.84 − 3.11 | — | — |
| 9* | −266.836 | 3.13 | 1.58547 | 29.9 |
| 10* | −23.319 | 2.69 | — | — |
| 11 | −9.419 | 1.75 | 1.80400 | 46.6 |
| 12 | 973.898 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 8 | 0.00 | $0.1099 \times 10^{-3}$ | $0.5383 \times 10^{-7}$ | — |
| 9 | 0.00 | $0.1281 \times 10^{-3}$ | $0.2719 \times 10^{-5}$ | $-0.3462 \times 10^{-8}$ |
| 10 | 0.00 | $0.5105 \times 10^{-5}$ | $0.3848 \times 10^{-5}$ | — |

[Embodiment 3]

FIGS. 9 through 12D show the third embodiment of the present invention. FIG. 9 is the lens arrangement of the third embodiment of a zoom lens system according to the present invention. Table 3 shows the numerical data of the third embodiment. FIGS. 10A through 10D show aberrations occur in the lens arrangement shown in FIG. 9 at the short focal length extremity. FIGS. 11A through 11D show aberrations occur in the lens arrangement shown in FIG. 9 at an intermediate focal length. FIGS. 12A through 12D show aberrations occur in the lens arrangement shown in FIG. 9 at the long focal length extremity. The basic lens arrangement of the third embodiment is the same as the first embodiment. The diaphragm S is located 1.50 millimeters behind (on the image side) the first lens group 10 (surface No. 7).

TABLE 3

$F_{NO} = 4.2 - 10.8 - 15.8$
f = 29.83 − 83.40 − 122.50 (Zoom Ratio:4.11)
W = 36.5 − 14.6 − 10.0
$f_B = 8.77 - 57.28 - 92.68$

| Surf. No. | r | d | Nd | ν |
|---|---|---|---|---|
| 1 | −14.393 | 1.88 | 1.83400 | 37.2 |
| 2 | −37.704 | 0.13 | — | — |
| 3 | 26.728 | 5.39 | 1.48749 | 70.2 |
| 4 | −9.400 | 1.50 | 1.83400 | 37.2 |
| 5 | −57.488 | 0.13 | — | — |
| 6 | 30.060 | 3.38 | 1.73077 | 40.5 |
| 7* | −13.908 | 10.72 − 3.39 − 2.08 | — | — |
| 8* | −82.529 | 3.01 | 1.58547 | 29.9 |
| 9 | −32.520 | 3.98 | — | — |
| 10 | −9.400 | 1.75 | 1.80400 | 46.6 |
| 11 | −56.559 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 7 | 0.00 | $0.9680 \times 10^{-4}$ | $0.1374 \times 10^{-6}$ | $-0.9000 \times 10^{-9}$ |
| 8 | 0.00 | $0.9530 \times 10^{-4}$ | $-0.1674 \times 10^{-6}$ | $-0.1348 \times 10^{-7}$ |

[Embodiment 4]

FIGS. 13 through 16D show the fourth embodiment of the present invention. FIG. 13 is the lens arrangement of the fourth embodiment of a zoom lens system according to the present invention. Table 4 shows the numerical data of the fourth embodiment. FIGS. 14A through 14D show aberrations occur in the lens arrangement shown in FIG. 13 at the short focal length extremity. FIGS. 15A through 15D show aberrations occur in the lens arrangement shown in FIG. 13 at an intermediate focal length. FIGS. 16A through 16D show aberrations occur in the lens construction shown in FIG. 13 at the long focal length extremity. The basic lens arrangement of the fourth embodiment is the same as the second embodiment. The diaphragm S is located 1.00 millimeters behind (on the image side) the first lens group 10 (surface No.8).

$F_{NO} = 3.9 - 9.1 - 15.8$
$f = 29.74 - 69.00 - 120.00$ (Zoom Ratio:4.03)
$W = 36.0 - 17.5 - 10.2$
$f_B = 9.88 - 46.13 - 93.22$

| Surf. No. | r | d | Nd | ν |
|---|---|---|---|---|
| 1* | 15.311 | 1.25 | 1.83481 | 42.7 |
| 2 | 12.286 | 4.01 | 1.66446 | 35.8 |
| 3 | 37.835 | 0.12 | — | — |
| 4 | 15.811 | 4.86 | 1.48749 | 70.2 |
| 5 | −11.020 | 1.13 | 1.80518 | 25.4 |
| 6 | −41.270 | 0.13 | — | — |
| 7 | 50.708 | 3.01 | 1.71850 | 33.5 |
| 8* | −16.073 | 9.87 − 3.78 − 1.81 | — | — |
| 9* | −80.297 | 3.13 | 1.66680 | 33.0 |
| 10* | −34.442 | 4.90 | — | — |
| 11 | −9.279 | 1.76 | 1.72916 | 54.7 |
| 12 | −129.476 | | | |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 1 | 0.00 | $-0.1209 \times 10^{-4}$ | $0.2090 \times 10^{-6}$ | — |
| 8 | 0.00 | $0.8490 \times 10^{-4}$ | $0.1831 \times 10^{-7}$ | — |
| 9 | 0.00 | $0.5765 \times 10^{-4}$ | $0.9375 \times 10^{-6}$ | $0.1138 \times 10^{-7}$ |
| 10 | 0.00 | $-0.3126 \times 10^{-4}$ | $0.1300 \times 10^{-5}$ | $0.1879 \times 10^{-7}$ |

Each condition of each embodiment is shown in the following Table 5.

TABLE 5

| | Embod.1 | Embod.2 | Embod.3 | Embod.4 |
|---|---|---|---|---|
| Cond.(1) | 5.480 | 6.031 | 6.318 | 6.461 |
| Cond.(2) | −1.044 | −1.623 | −1.030 | −1.421 |
| Cond.(3) | 0.148 | 0.177 | 0.117 | 0.128 |

As can be understood from Table 5, each embodiment satisfies each condition. Furthermore, as can be understood from the aberration diagrams, the aberrations are relatively well corrected.

According to the above description, a small telephoto two-lens-group zoom lens system, which has a zoom ratio of 3.5 or more, and the half angle-of-view of 35 degrees or more at the short focal length extremity, can be obtained.

What is claimed is:

1. A zoom lens system comprising a positive first lens group, and a negative second lens group, in this order from an object, wherein zooming is performed by varying the distance between said first lens group and said second lens group;

wherein said first lens group comprises a negative first sub lens group and a positive second sub lens group, in this order from said object; and wherein said zoom lens system satisfies the following conditions:

$5.0 < ft/f1 < 7.0$ $0.9 < |fw/f1a| < 1.8$ wherein
    ft designates the focal length of the entire zoom lens system at the long focal length extremity;
    f1 designates the focal length of said first lens group;
    fw designates the focal length of the entire zoom lens system at the short focal length extremity; and
    f1*a* designates the focal length of said first sub lens group of said first lens group.

2. The zoom lens system according to claim 1, wherein the most object-side lens element of said first lens group comprises a negative lens element having a concave surface facing said object, and wherein said zoom lens system satisfies the following condition:

$0.1 < |r1/ft| < 0.2$ wherein
    r1 designates the radius of curvature of the object-side concave surface of the most object-side negative lens element of said first lens group.

3. The zoom lens system according to claim 1, wherein at least one surface of lens elements in said first lens group comprises an aspherical surface; and wherein at least one surface of lens elements in said second lens group comprises an aspherical surface.

* * * * *